Aug. 24, 1954     I. C. MAXWELL ET AL     2,687,241
PRESSING MACHINE

Filed Feb. 20, 1950            11 Sheets-Sheet 1

INVENTORS
IRA C. MAXWELL
OLE H. LANGEN
DAN R. PLEHAL

BY Paul, Paul & Moore

ATTORNEYS

Aug. 24, 1954

I. C. MAXWELL ET AL 2,687,241

PRESSING MACHINE

Filed Feb. 20, 1950

INVENTORS
IRA C. MAXWELL
OLE H. LANGEN
DAN R. PLEHAL
BY Paul, Paul & Moore
ATTORNEYS Aug. 24, 1954     I. C. MAXWELL ET AL     2,687,241
PRESSING MACHINE Filed Feb. 20, 1950     11 Sheets-Sheet 5

INVENTORS
IRA C. MAXWELL
OLE H. LANGEN
DAN R. PLEHAL
BY
Paul, Paul & Moore
ATTORNEYS INVENTORS
IRA C. MAXWELL
OLE H. LANGEN
DAN R. PLEHAL
BY Paul, Paul & Moore
ATTORNEYS Aug. 24, 1954   I. C. MAXWELL ET AL   2,687,241
PRESSING MACHINE Filed Feb. 20, 1950   11 Sheets-Sheet 7

INVENTORS
IRA C. MAXWELL
OLE H. LANGEN
DAN R. PLEHAL
BY
Paul, Paul & Moore
ATTORNEYS

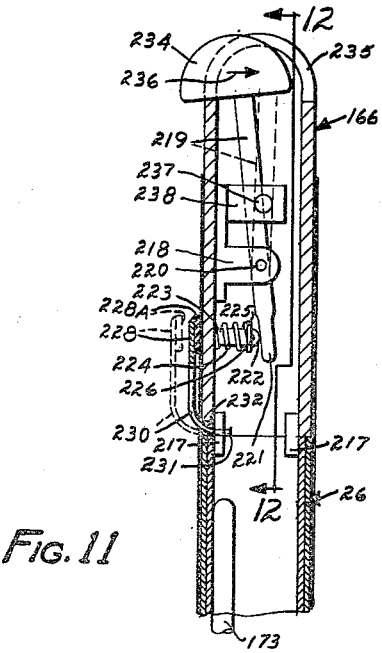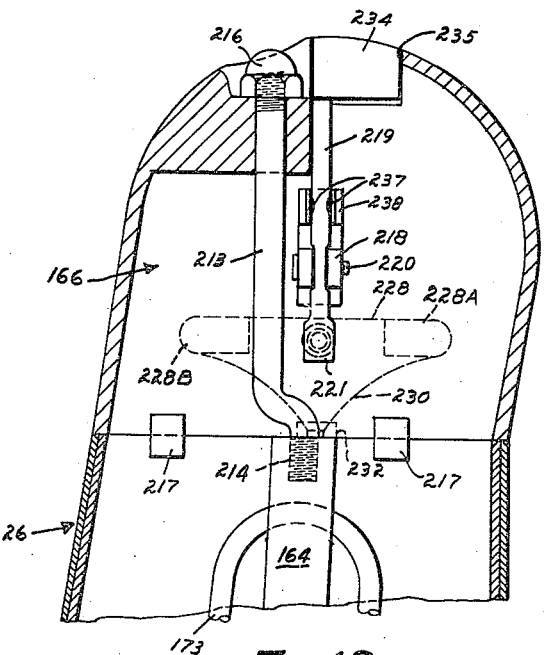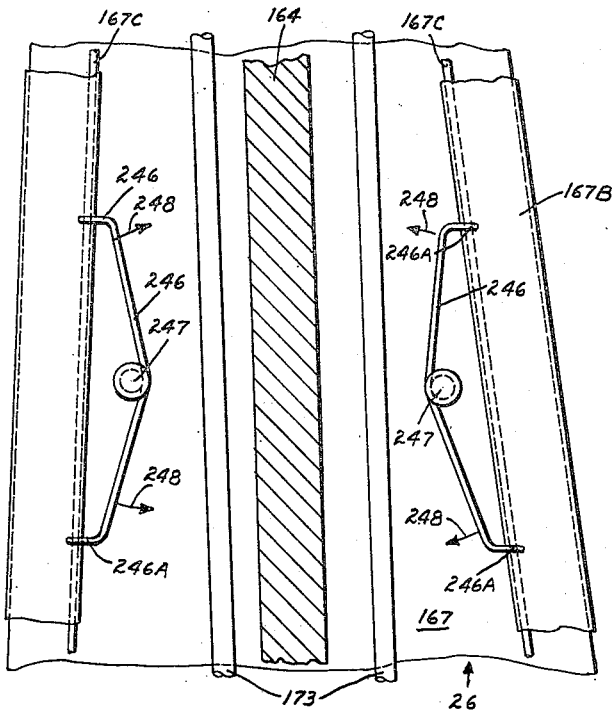

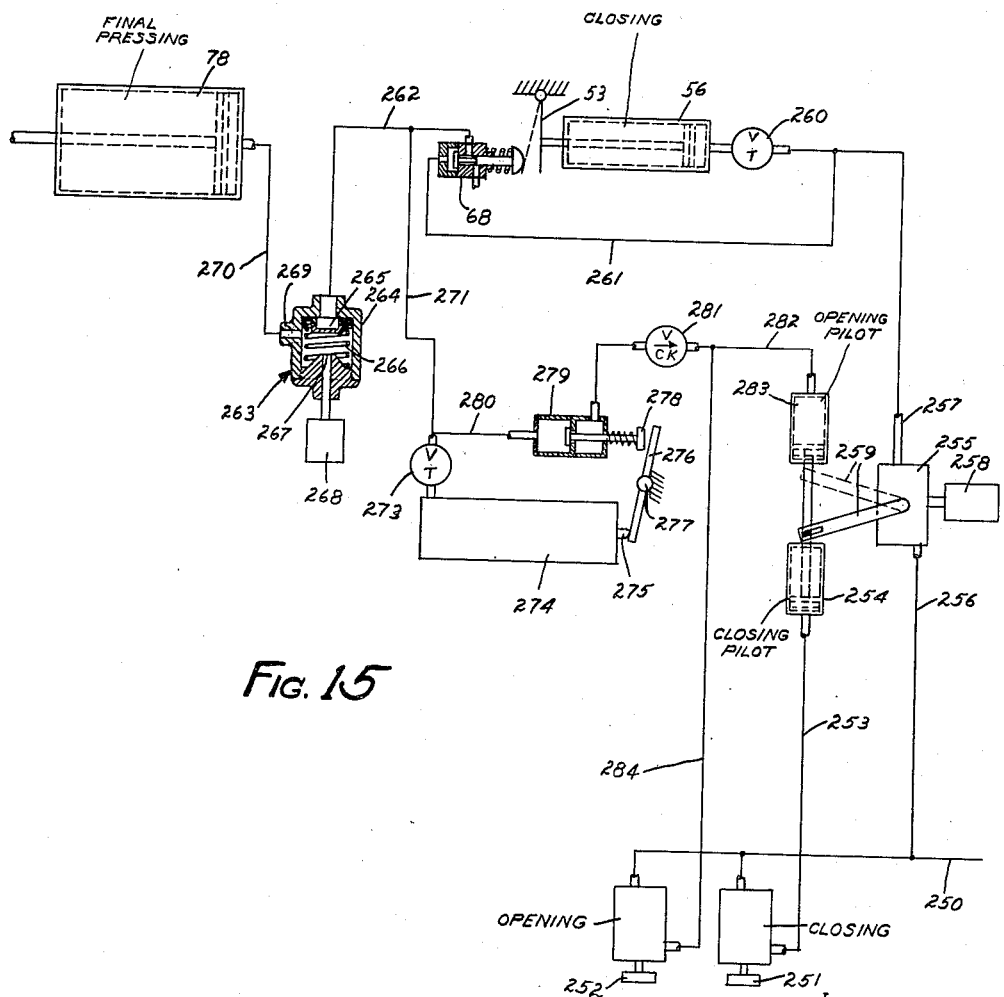

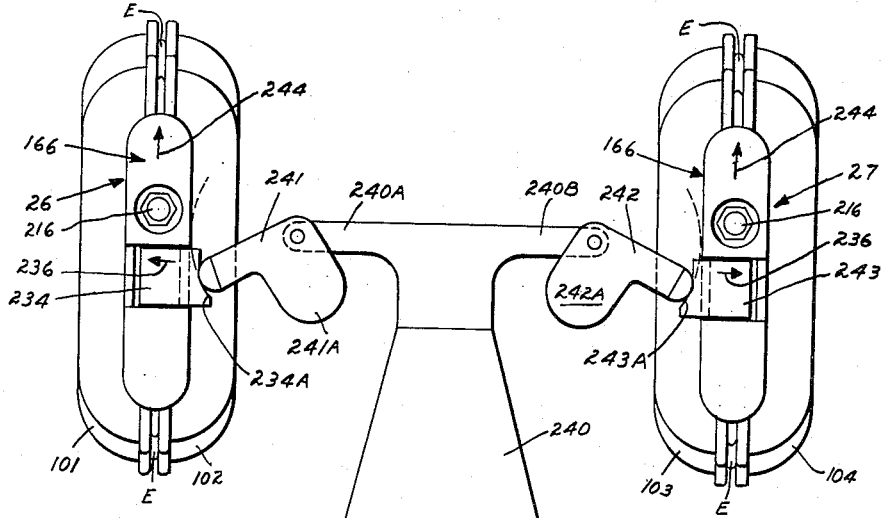
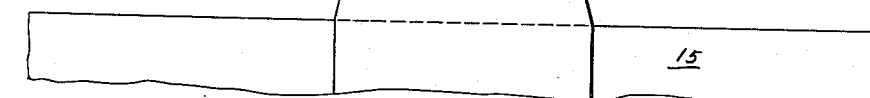
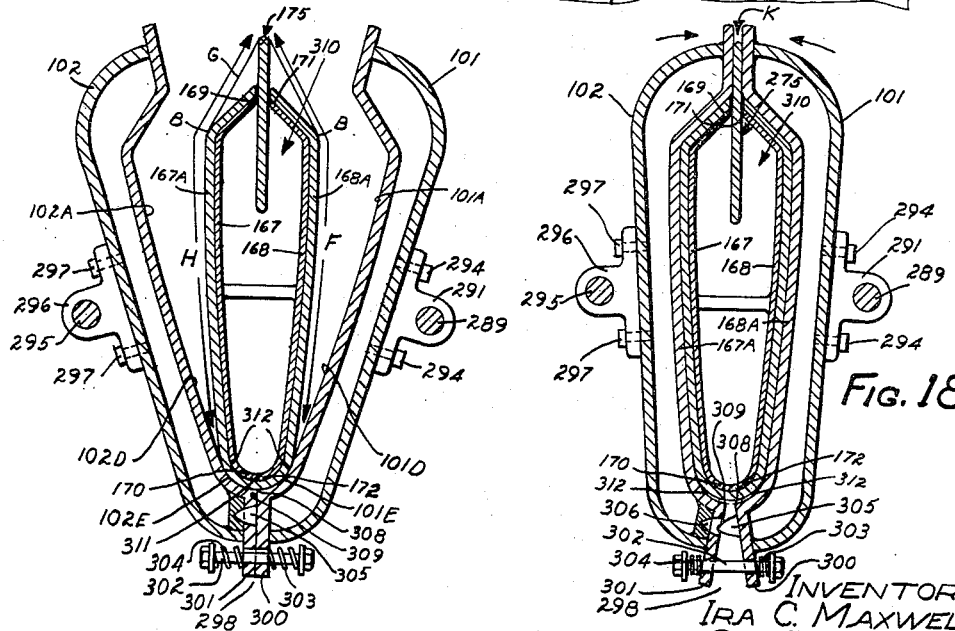

Aug. 24, 1954     I. C. MAXWELL ET AL     2,687,241
PRESSING MACHINE

Filed Feb. 20, 1950                        11 Sheets-Sheet 11

INVENTORS
IRA C. MAXWELL
OLE H. LANGEN
DAN R. PLEHAL
BY Paul, Paul & Moore
ATTORNEYS Patented Aug. 24, 1954

2,687,241

UNITED STATES PATENT OFFICE 2,687,241

PRESSING MACHINE

Ira C. Maxwell and Ole H. Langen, Minneapolis, and Dan R. Plehal, Robbinsdale, Minn., assignors, by mesne assignments, to The Unipress Company, Incorporated, Minneapolis, Minn., a corporation of Minnesota Application February 20, 1950, Serial No. 145,258

24 Claims. (Cl. 223—73)

This invention relates to power driven pressing machinery which has for its purpose the pressing of tubular sections of garments, such as sleeves, pant legs and the like. Apparatus of this character has its principal application in the pressing of the sleeves of shirts, hospital coats, jackets and the like. Heretofore, the pressing of garment sleeves has usually been accomplished by sleeving the tubular section desired to be pressed on a slender form or "buck" whereupon a longitudinal portion of the tubular section is pressed by bringing a presser head down smartly against the buck. The presser head is then manually released and the tubular section is loosened from the buck and rotated so as to bring a fresh unpressed area over the buck, and the operation repeated as many times as is necessary to go around a complete tubular section. The pressing function is thus accomplished in two or more lays of the tubular section on the buck. In some few instances machines have been suggested, the object of which is to press the tubular section, such as a sleeve, in one lay of the garment. To accomplish this it has been the usual practice to sleeve the tubular section onto a form of spatulate character, provision usually being made for expanding the spatulate form for the purpose of taking up slack in the tubular configuration to produce a comparatively uniform pressing effect over most of the tubular area of the garment. Presses of this character have left much to be desired in that they are complicated, heavy and difficult to use.

It is an object of the present invention to provide an improved pressing machine wherein a sleeve or other tubular garment section may be pressed in a single lay and only a minimum amount of area of the sleeve left out of contact with the presser head.

It is a further object of the invention to provide an improved pressing machine for pressing a tubular garment section in one lay but by means of a combination of pressing actions of a form with reference to presser heads that are movable by compound motions.

It is a further object of the invention to provide an improved one-lay pressing machine for tubular garment sections wherein a spatulate form having plural wings is provided capable of being expanded automatically or manually for initially tensioning the tubular garment section on the form and thereafter the pressing operation shall be carried out without further control of the operator.

It is another object of the invention to provide in such a pressing machine improved means for holding a cuff of the garment section during the pressing operation and for automatically releasing the same at the conclusion of the pressing operation.

It is a further object of the invention to provide an improved pressing machine for tubular garment sections wherein the pressing operation is carried out by improved methods and wherein all but a single narrow line along the length of the tubular garment section is pressed by contact with the presser heads and in such a machine and method to provide an improved compound pressing action through the cooperative action of a spatulate form against certain portions of the presser head and then automatically by cooperation of the presser head against other portions of the spatulate form.

It is another object of the invention to provide an improved spatulate form with one or more expanding wings for tensioning the garment thereon.

It is a specific object of the invention to provide in a one-lay sleeve press machine cooperative pressing heads having a compound movement translatory and rotary with respect to each other.

It is another object of the invention to provide an improved pressing machine having a pair of pressing heads hinged together for maintaining contact with each other so as to present, by their mutual cooperative action, a single pressing area throughout one part of the pressing operation and then to rock them relative to each other for completing the pressing operation.

It is another object of the invention to provide an improved pressing machine and method for one-lay pressing of tubular garment sections wherein a comparatively narrow longitudinal area along the tubular garment section is first pressed by cooperative pressing action of a spatulate form against certain areas of a pair of presser heads and thereafter in sequential and timed relation to have the presser heads moved relative to each other and to the spatulate form for completing said pressing operation by rocking movement.

It is another object of the invention to provide an improved method and apparatus for operating movement of the spatulate form in a one-lay sleeve press in timed sequence relative to the closure of a pair of presser heads against said spatulate form.

Other and further objects of the invention are those inherent in the apparatus herein illustrated, described and claimed.

The invention is illustrated with reference to the drawings in which corresponding numerals refer to the same parts and in which.

Figure 1:
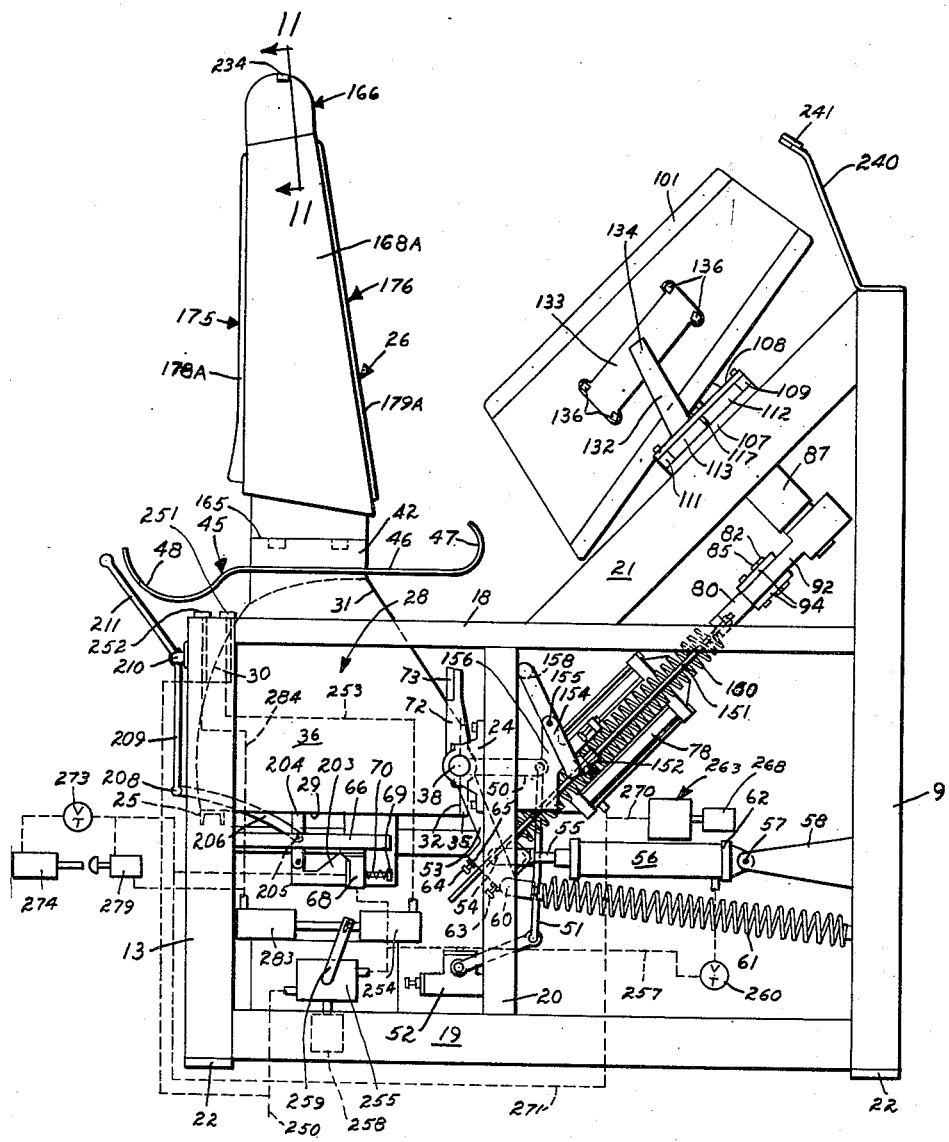
Figure 1 is a side elevational view of a machine of the present invention showing the air circuits thereof diagrammatically and illustrating the machine in the open position for sleeving a tubular section of a garment thereon.
Figure 3:
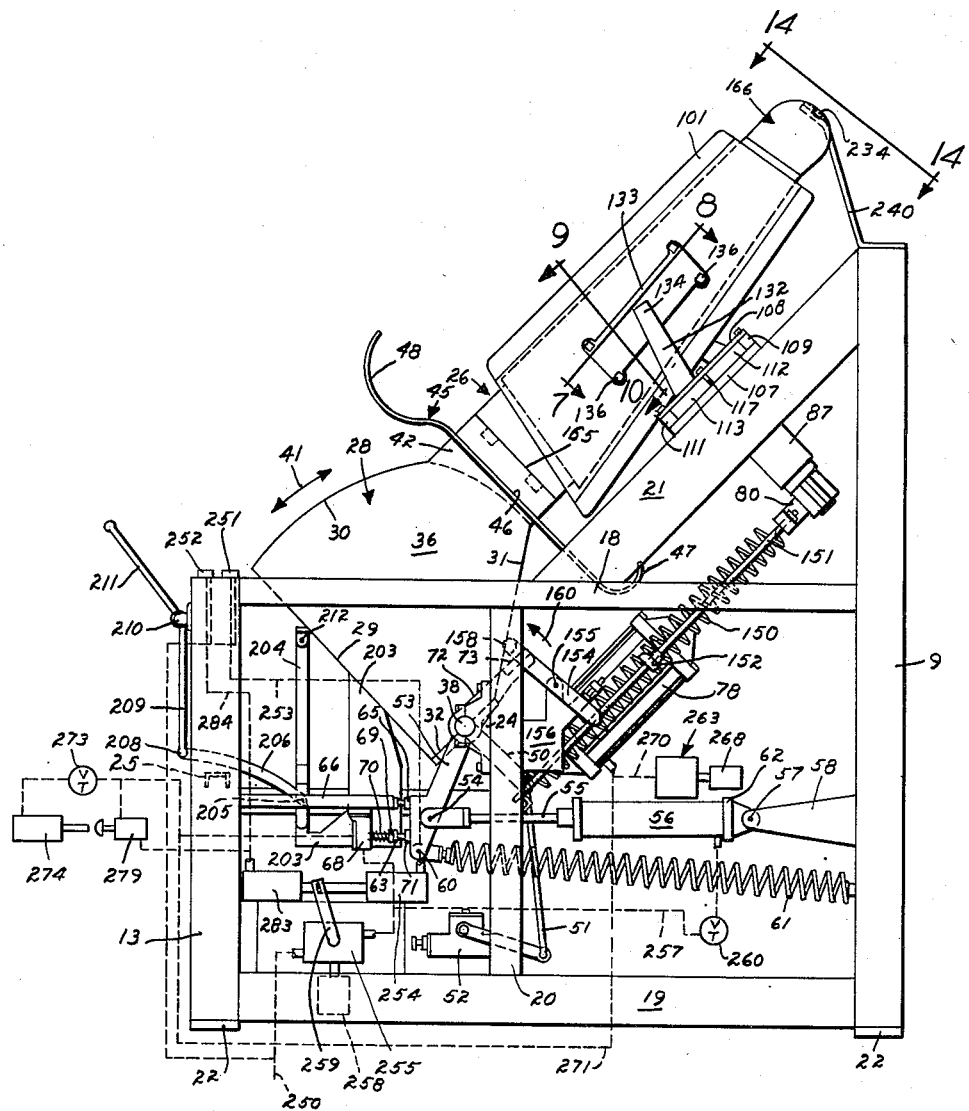
Figure 3 is a side elevational view corresponding to Figures 1 and 2 but showing the position of the machine when the presser heads are moved into pressing engagement with the spatulate form carrying the tubular section of the garment.
Figure 9:
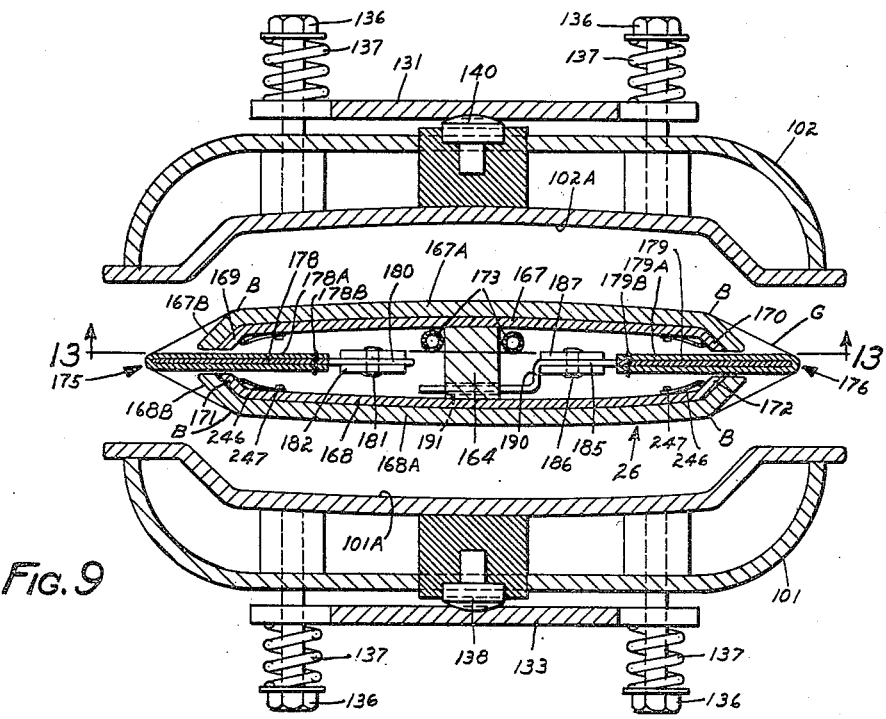
Figure 10:
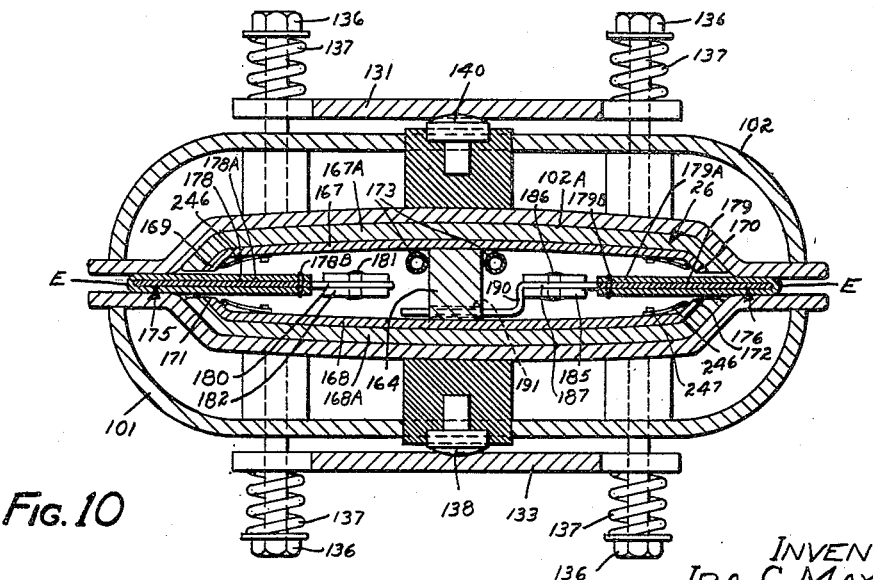
Figure 16:
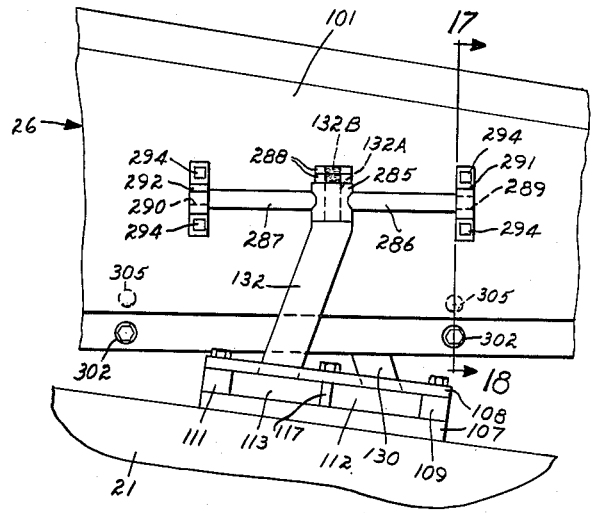
Figure 19:
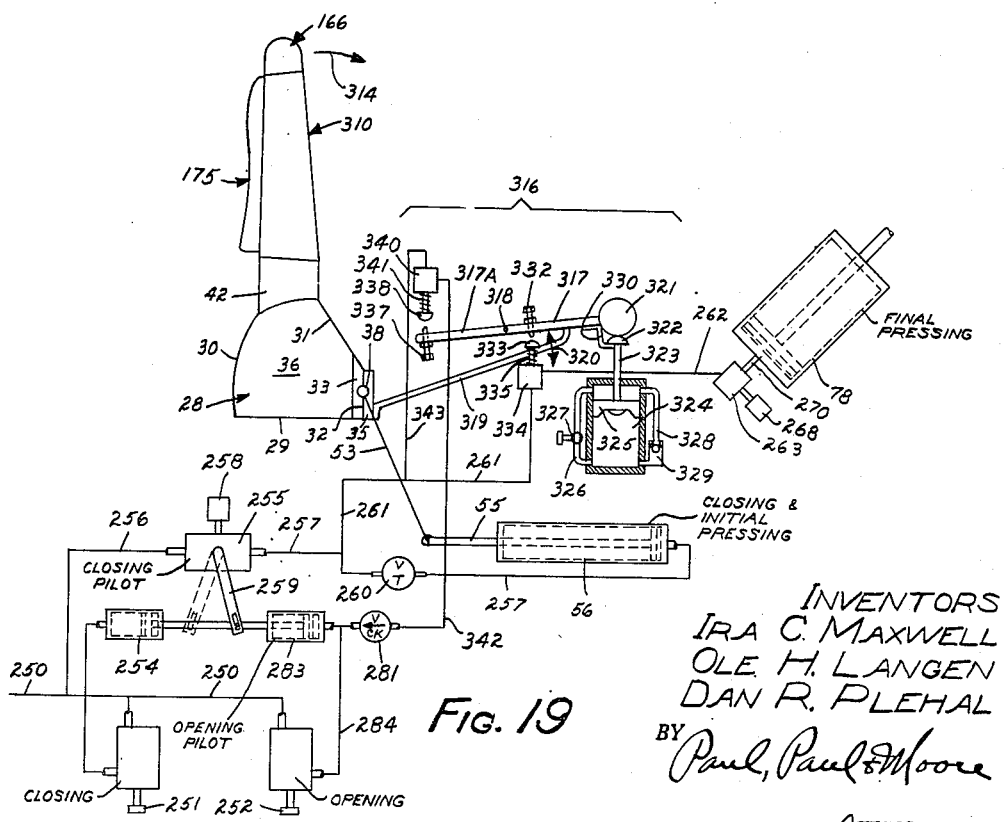

Figures 9 and 10 are a pair of views taken along the line and in the direction of arrows 9—10 of Figure 3, illustrating a transverse section through the presser head and spatulate form, Figure 9 showing the spatulate form with the wings thereof expanded so as to tension the tubular garment section thereon and illustrating in section the presser heads in their spaced condition before pressing action has been initiated. Figure 10 corresponds to Figure 9 but shows the presser heads after they have moved into pressing engagement with the spatulate form;

Figure 11 is an enlarged fragmentary sectional view of the tip end of the spatulate form, Figure 11 being taken along the line and in the direction of arrows 11—11 of Figure 1;

Figure 12 is a sectional view corresponding to Figure 11, except that it is taken along the line and in the direction of arrows 12—12 of Figure 11. Figures 11 and 12 together show the end construction of the spatulate form and the cuff holder clamp and its manner of operation;

Figure 13 is an enlarged fragmentary detail view taken along the line and in the direction of arrows 13—13 of Figure 9, illustrating the manner in which the buck cover is fastened to the padded sides of the spatulate form;

Figure 14 is an enlarged view taken along the line and in the direction of arrows 14—14 of Figure 3 and illustrates the manner in which the cuff clamps are automatically released during the opening operation of the press;

Figure 15 is an air circuit diagram of the air cylinders and controls therefor of the press shown in Figures 1–14;

Figures 16 through 19 illustrate a modified form of presser head and press construction for improved pressing where it is desired to have all of the sleeve pressed by contact with the pressing head except for one tiny longitudinal area of negligible width. Figure 16 is an enlarged fragmentary side elevational view of the presser heads and the mechanism for carrying and mounting the same. Figures 17 and 18 are a pair of views taken along the line and in the direction of arrows 17—18 of Figure 16, Figure 17 illustrating the initial portion of the pressing operation by means of which a narrow portion of the sleeved on garment is first pressed by action of the spatulate form against an area formed by the combined actions of the two presser heads, and Figure 18 showing how the pressing action is completed by movement of the presser heads together with consequent separation of the presser heads and division of the area which was initially formed by their cooperative action for the first part of the pressing operation. Figure 19 is a schematic view of the pressing machine showing particularly the air circuits, the pneumatic cylinders for operating the press and the controls therefor.

Referring first to Figures 1 through 14 the pressing machine of the invention comprises a frame having rear upright members 9 and 10 and front upright members 12 and 13. The rear members are connected together by cross frame pieces 14 and 15, while the front posts are connected together by cross frame pieces 16 and 17. The front and rear posts on both sides are connected together by side frame members 18 and 19, as shown in Figure 1, and there are similar side frame members on the opposite side of the press. At about the mid-point from front to back the side frame members 18 and 19 are connected together by a stiffening brace 20, a similar brace being provided at the opposite side of the machine. From the side rail 18 there extends upwardly at an angle the stiffening frame 21 which serves, as hereinafter pointed out, to carry the presser head actuating mechanisms on which the presser heads are mounted. Each of the posts is preferably provided with a floor plate as at 22.

On the stiffening brace 20 and on the corresponding stiffening brace at the opposite side of the machine, there is mounted a bearing block 24 which serves to carry a shaft 38 upon which a pair of spatulate form mechanisms generally designated 26 and 27 are mounted for swinging movement. These spatulate form mechanisms 26 and 27 are mounted at their lower ends on a swinging housing generally designated 28 composed of a pair of side plates having a lower edge 29, a curved front edge 30 and a rear edge along straight lines 31 and 32. The side plates are connected together by a curved front sheet 34 and are held in place by the clamps 33 and 35 attached to the side plates 36 and 37 and clamped onto the shaft 38. The housing is open at the rear. The width of the housing, as viewed from the front, is from the side plate 36 to the side plate 37. On the flat face of the housing 32 there is mounted the shaft 38 which extends into the bearing blocks 24 and 40. The curved surface 30 is arcuate around the axis of shaft 38 and just clears the inner edge of the front frame member 17. Hence, the entire housing is free to move in the direction of double arrows 41 (see Figures 2 and 3) about the shaft 38 and as it does so the front panel 34 moves just inside of the rear edge of the frame member 17. Extending upwardly from the top of the housing there are a pair of protuberances 42 and 43 which serve as mountings for the individual spatulate forms generally designated 26 and 27. Any convenient form of removable coupling can be used between the spatulate forms and these protuberances 42 and 43 so as to permit the removal of the spatulate form mechanisms as units from the housing. The construction of the spatulate forms will be described in greater detail hereinafter.

Extending across from the protuberances 42 and 43 there is provided a pan 45 having a flat portion at 46, a rear upwardly curved edge 47 and a downwardly and then upwardly curved front portion 48 which serves to hold the remainder of a garment, the tubular portions of which may be sleeved on the forms. The pan is set high enough on the protuberances 42 and 43 so that it easily clears the frame of the machine when the member 28 and the spatulate form are moved arcuately and the rear portion of the pan is sufficiently narrow so that it moves in between the frame brace 21 and the corresponding brace on the opposite side of the machine.

Figure 4:
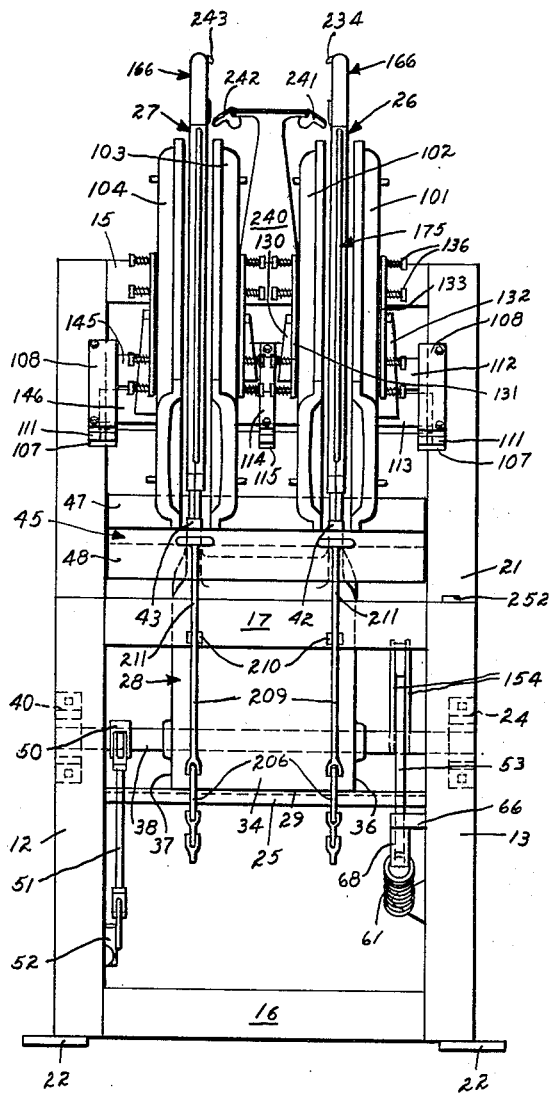
Figure 4 is a front elevational view showing the machine in the open press position, the machine being the same as that shown in Figures 1–3.

Referring to Figure 4, it will be observed that at the left end of the shaft 38, as viewed from the front, there is provided a crank at 50 which is connected by a link 51 to a hydraulic shock absorbing mechanism 52. The crank 50, link 51 and hydraulic shock absorber 52 are also shown in Figure 1 and to some extent in Figures 2 and 3. This mechanism serves to slow down and cushion the movement of the spatulate form assembly at the limits of its arcuate travel.

Figure 2:
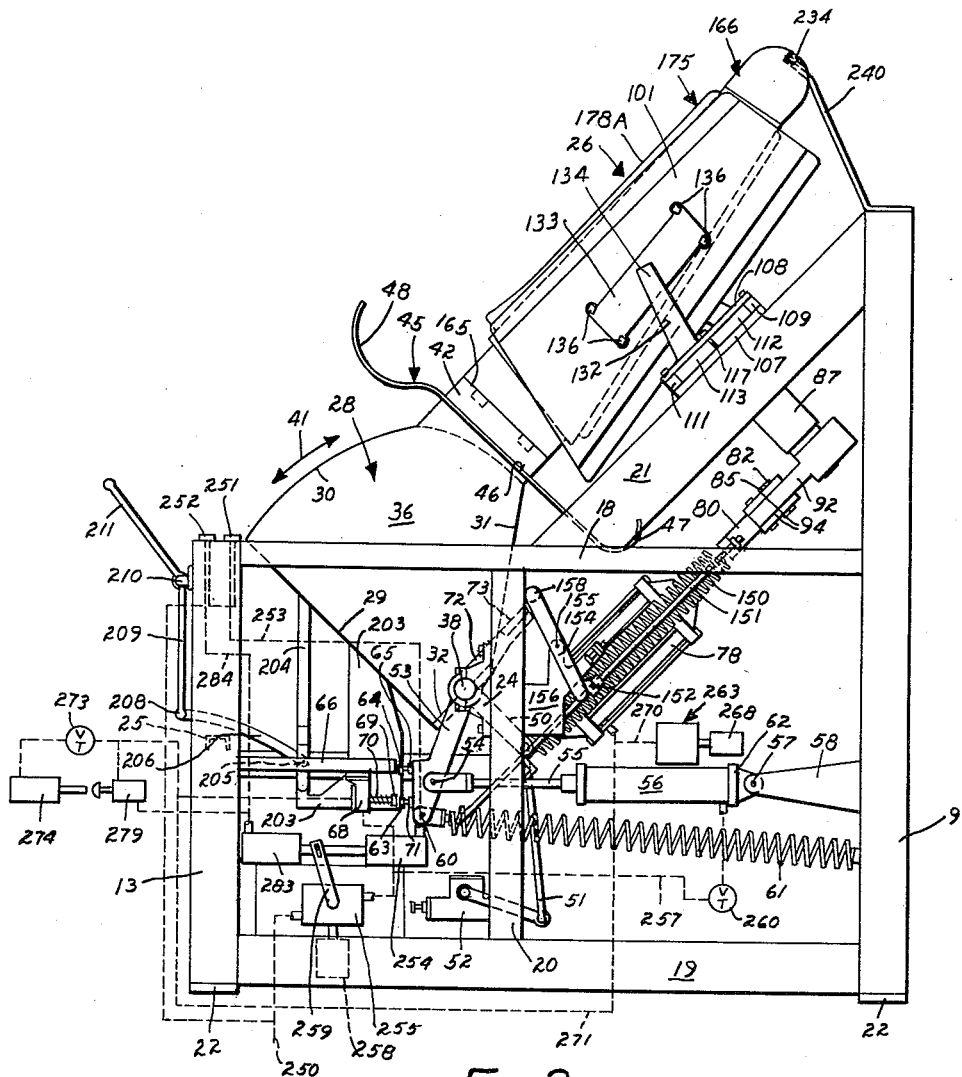
Figure 2 is a side elevational view corresponding to Figure 1, but illustrating the pressing machine with the spatulate form moved into a position so as to be engaged by the presser heads for pressing operation but before said presser heads are operated.

At the right end of shaft 38, as viewed from the front, there is provided an operating crank 53 which is connected by the clevis 54 to the piston rod 55 of the closing air cylinder 56, the rear end of the air cylinder being pivoted at 57 on the bracket 58 mounted to the rear frame member of the machine. To the lower end of the operating crank 53 there is also pivotally attached at 60 one end of the spring 61, the opposite end of the spring being likewise attached to the rear frame member 9 of the machine. The spring 61 is tensioned so that it normally pulls the crank 53 to the position shown in Figure 1, the limit of travel in this direction being determined by a channel iron 25 which is positioned between the corner posts 12 and 13, it being noted that the bottom of sides 36 and 37 rest on the channel. In this position the spatulate forms 26 and 27 are upright, as shown in Figure 1. The limit of travel to the position shown in Figures 2 and 3 is determined by an adjusting cap screw 64 that is screwed into the lever 53 and held in adjusted position by the lock nut 65. The head of this cap screw hits against a stop 66 that is firmly fastened to the front frame post 13 of the machine.

Upon the stop 66 there is mounted an air control valve 68 having an operating stem 69 that is normally pressed towards the rear of the machine by the spring 70. The operating stem 69 is in a position so that it will be engaged by the head 63 of a second cap screw that is likewise threaded into the lever 53, this screw also being held in adjusted position by the lock nut 71. The air valve 68 is normally closed, in the position shown in Figure 1, but is operated when the head 63 of the screw presses against the operating stem 69 of the valve. This occurs when the spatulate form mechanism 28—26—27 has been swung to the position shown in Figure 3, and upon operation of valve 68 the presser heads are moved into engagement with the spatulate form, as hereinafter more fully described. Upon the shaft 38, which serves to pivot the spatulate form mechanism, there is also fixedly attached the lever 72 which has a hardened pad of steel at 73. The hardened and machined surfaces at the end and face of the pad 73 serve as locking surfaces, as will presently be described.

Figure 5:
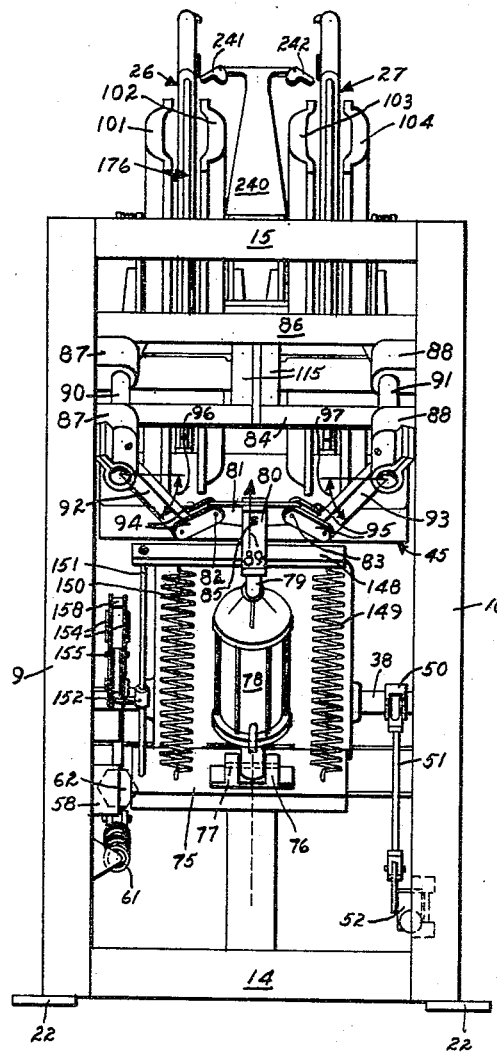
Figure 5 is a rear elevational view of the machine shown in Figures 1–4 and showing the machine in the open press condition.

Upon the rear of the machine there is mounted a heavy cross frame member, as shown at 75 in Figure 5, which serves to support a pivot block 76 carrying the pivot pin 77 on which the lower end of the large air cylinder 78 is mounted. The piston rod 79 of the cylinder moves in and out a short distance from the position shown in Figure 2 to the position shown in Figure 3. The piston has a clevis 80 at its upper end which carries the single-tree 81 having pivots 82 and 83 at its outer ends. Extending crosswise in respect to the press, from the bracer frame 21 to the corresponding bracer frame on the opposite side of the press, there are provided the heavy brace members 84 and 86 and at each end of these levers there are provided pairs of bearings 87—87 and 88—88. In the pairs of aligned bearings 87 there is pivotally mounted the shaft 90 and in the bearings 88 there is pivotally mounted the shaft 91. To the lower end of the shaft 90 there is attached the crank 92 and to the lower end of the shaft 91 there is attached a similar crank 93. Each of these cranks is keyed or pinned to its shaft so that when the crank 92 or 93 is actuated, the shafts 90 and 91, respectively, will likewise be actuated. The cranks are actuated by links 94 and 95 which connect the crank 92 to the pivot 82 on the single-tree 81, the crank 93 being likewise connected by the links 95 to the pivot 83 on the single-tree. Accordingly, as the clevis 80 on the end of the piston rod 79 is moved in the direction of arrow 89, by movement of the piston rod 79 outwardly from cylinder 78 when air is applied, this moves the single-tree 81 in the same direction, and it pulls on the links 94 and 95, causing the cranks 92 and 93 to be moved in the direction of arrows 96 and 97. The effect of this relatively short arcuate movement of the cranks 92 and 93 and the corresponding arcuate movement of the shafts 90 and 91, respectively, is to cause the presser heads 101 and 102 to move toward each other and to cause the presser heads 103 and 104 likewise to move towards each other into pressing engagement with the spatulate forms. The fact that the single-tree 81 is pivoted at 85 on the clevis 80 permits an equalization of movement in case a lesser amount of movement of one set of presser heads 101—102 is accomplished than for heads 103 and 104, or vice versa. The effect is that piston rod 79 will continue to travel upwardly and move the clevis 80 in the direction of arrow 89 until the pairs of presser heads 101—102 and 103—104 are moved firmly into engagement with the spatulate form. When air is exhausted from cylinder 78, the reverse operation takes place.

Figure 7:
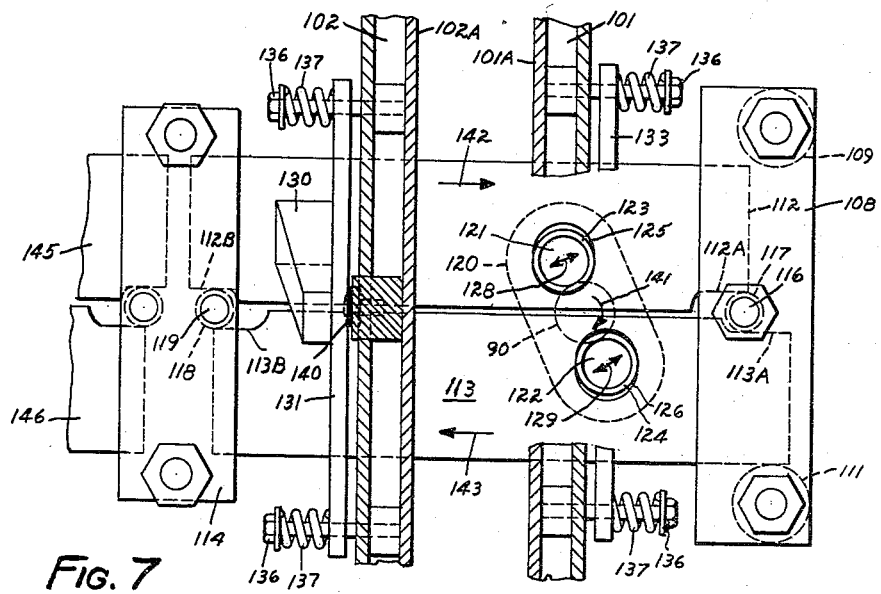
Figures 7 and 8 are a set of views taken along the line and in the direction of arrows 7—8 of Figure 3, illustrating the mechanism by which the presser heads are moved toward and away from each other, Figure 7 illustrating the position of the heads in the open press position, and Figure 8 the position of the heads in the closed press position.

The mechanism by which the rotation of shafts 90 and 91 moves presser heads 101—102 and 103—104, respectively, can best be seen in Figures 1, 7 through 10. On brace member 21 and the corresponding brace member on the opposite side of the machine, there is provided a bearing composed of plates 107 and 108 that are spaced apart by the block 109 and 111. These plates and blocks form bearing surfaces in which the slide members 112 and 113 are adapted to move endwise. Referring to Figure 7 it will be observed that at the middle of the machine there is provided a similar bearing slide of which the top plate 114 is visible in Figure 7 and the bottom plate 115 is visible in Figure 5. There plates serve to support the opposite ends of the slide bars 112 and 113. It will be noted that each of the slide bars are notched away along their adjacent surfaces. Thus, bar 112 is notched away at each end so as to provide bearing surfaces 112A and 112B and the bar 113 is notched away so as to provide bearing surfaces 113A and 113B. Between the upper and lower bearing plates, such as between plates 107 and 108, as shown in Figures 1, 2 and 3, and at about the middle thereof, there is provided a through bolt at 116 on which the hardened roller 117 is adapted to turn. Similarly, a hardened roller 118 is pivoted on the bolt 119 on the center bearing 114. Accordingly, the bars 112 and 113 can move back and forth a limited amount. As shown in Figure 7 the shaft 90 terminates in a flat end plate 120 having pivots at 121 and 122, each pivot being provided with a hardened bearing roller as at 123 for pivot 121 and 124 for pivot 122. The bar 112 is provided with a transverse slot at 125 and the bar 113 is provided with a transverse slot at 126, these slots being only long enough to permit the rise and fall of rollers 123 and 124 in their respective slots. It will be remembered that the end plate 120 attached to the shaft 90 moves arcuately a slight amount corresponding with the arcuate movement of the shaft 90 and the lever 92, Figure 5, and this imparts back and forth arcuate movement to the pins 121 and 122, as shown by the arrows 128 and 129. As this arcuate movement is imposed upon the pivot pins 121 and 122, they impose a corresponding movement on the bearing sleeves 123 and 124, and the latter impose a back and forth movement on the sliding plates 112 and 113.

Figure 8:
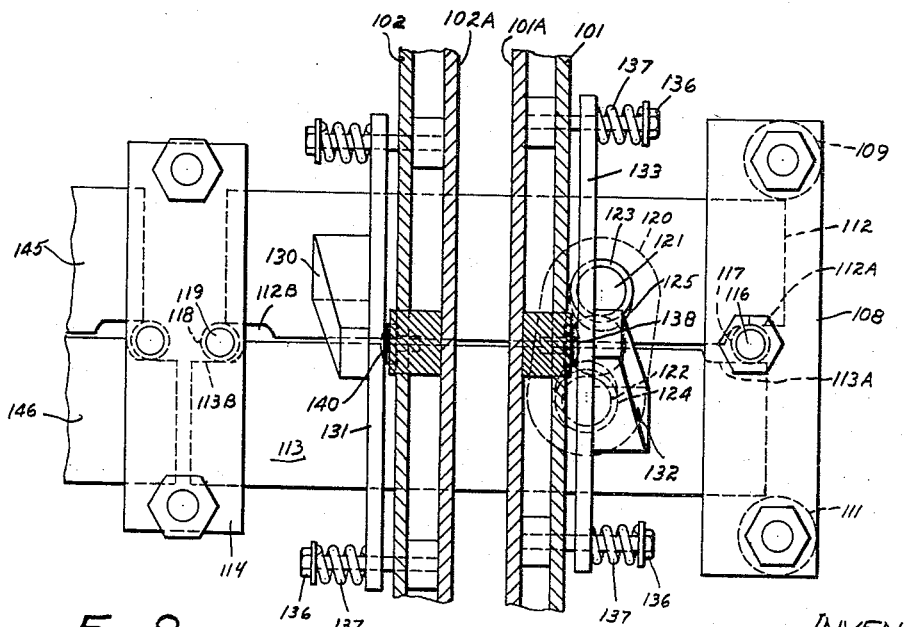

Referring to Figures 7 and 8, the slide plate 112 has an upstanding arm 130 fixed thereon which, at its upper end, has fixed thereto a cross plate 131 of liberal dimensions. Similarly, the slide plate 113 has a stiff upstanding arm at 132 and carries a rectangular cross plate at 133. Both of the cross plates 131 and 133 and their supporting arms are positioned so that the outer tip end of the arms 130 and 132 are nearly opposite each other at the region 134, for bracket 132, as shown in Figures 1–3. The plates 131 and 133 for each of the brackets are substantially aligned and at their four corners are apertured so as to receive therethrough four studs extending outwardly from the presser heads that they serve to support. Thus, as shown in Figures 1–3, the plate 133 has the studs 136 at each of its outer corners, the studs being capped with nuts under which are disposed the springs 137 as shown in Figures 7–8. The studs are firmly mounted in the presser head 101, Figures 1–3, and between the presser head and the middle of the plate 133 there is a rounded bearing button at 138 which can, if desired, be backed up by a very stiff spring, not shown. The springs 137 are tensioned enough so that the button 138 is held firmly against the center of the plate 133, and the springs are adjusted so that the presser head 101 is nearly parallel to the adjacent face of the spatulate form 26 when the latter is in place for pressing.

The mounting for the presser heads 102, 103 and 104 is exactly similar, it being noted that the rounded bearing button 140 between the presser head 102 and its supporting plate 131, is likewise at the center of the plate and is in alignment with the button 138. The pressure is applied by the upstanding arm 130 which is attached to the slide bar 112, and 132 which is attached to the slide bar 113. In Figure 7 the slide bars are shown in the position where they hold the two presser heads 101 and 102 separated from each other, but when the shaft 90 is turned in the direction of arrow 141 the slide bar 112, which carries the presser head 102, will move in the direction of arrow 142 and the slide bar 113, which carries the presser head 101 is moved in the direction of arrow 143, thus moving the presser heads toward each other to the position shown in Figure 8. It will be appreciated that in Figure 8 the spatulate form is not shown in order that the drawings may not be too complicated, but the spacing of the presser heads in Figure 8 is the closed-press condition in which the inner surfaces 101A and 102A of the two opposed presser heads are in engagement with the pressing surfaces of the spatulate form. The rounded buttons 138 and 140 permit freedom of movement in all directions and hence equalization of the pressure against the spatulate forms. The position of the rounded buttons 138 and 140 relative to the spatulate form is such that it is at substantially the center of pressure against the spatulate form, as shown in Figure 2. When the shaft 90 is rotated in the direction opposite to arrow 141, the reverse function is obtained and the presser heads 101 and 102 are moved from the position shown in Figure 8 to the position shown in Figure 7.

In Figures 7 and 8 there are also shown the ends of the slides 145 and 146 which are mounted in exactly the same way as slides 112 and 113 and in axial alignment with those slides. The slide 145 serves to carry presser head 103, whereas slide 146 carries presser head 104, the slides 145 and 146 being operated in precisely the same way as described for slides 112 and 113, except from shaft 91, Figure 5. In this manner, when air cylinder 78 is energized and air under pressure is introduced into it, the presser heads 101 and 102 are moved from the position shown in Figure 5 to the closed press position where they engage the spatulate form 26. At the same time the presser heads 103 and 104 likewise engage their spatulate form 27.

To the clevis 80 there is attached a cross bracket 148, Figure 5, which extends a little more to the left, as shown in Figure 5, than it does to the right. At equal distances on the opposite sides of the cylinder 78 are a pair of springs 149 and 150, the upper ends of each of these springs being attached to the cross bar 148 and the lower ends to the cross frame member 75. The springs serve to retract the piston rod 79 into its cylinder and hence to move the presser head 101—102 and 103—104 to the open-press position shown in Figure 5. At the left end of the cross bar 148, as shown in Figure 5, there is a control rod 151 which has a collar and side extension 152 attached to it. The side extension 152 pushes the lever bars 154 to the upright (unlocking) position, Figures 1 and 2, and in this position they do not lock against plate 73 of the lever 72. Lever bars 154 are spaced from each other and pivoted about the pivot pin 155 on the bracket 156. Between the upper spaced ends of the lever bars 154 there is a roller 158 that is positioned so that when the lever 154 is moved from the position shown in Figure 2 to the position shown in Figure 3, the roller will enter over the hardened locking plate 73 on the locking lever 72 that is attached to the shaft 38. The rod 151 is drawn upwardly when the cylinder 78 has air introduced into it for moving the presser heads 101—102 and 103—104 to the closed-press position, which is shown in Figure 3, and as it leaves contact with the lower end of lever arms 154 the weight of the roller 158 at the upper end causes them to fall down to the locking position shown in Figure 3 where the roller 158 has entered over the plate 73 on the lever 72. In this position the roller 158 and lever 154 serve to hold the lever 72 from movement in the direction of arrow 160 and hence prevent the spatulate form mechanism from being retracted from the position shown in Figures 2-3 to the position shown in Figure 1. The locking effect of lever 154 continues until the rod 151 is moved back down to the position shown in Figure 1, at which time the collar and arm 152 on the rod again engages against the lower end of arm 154 and causes it to be moved from the position shown in Figure 3 to the position shown in Figure 2. This unlocking accordingly occurs only after the presser heads 101—102 and 103—104 have been moved to the completely open-press position, at which time the spatulate forms are in condition to be swung outwardly from the position shown in Figures 2-3 to the position shown in Figure 1.

Figure 6:
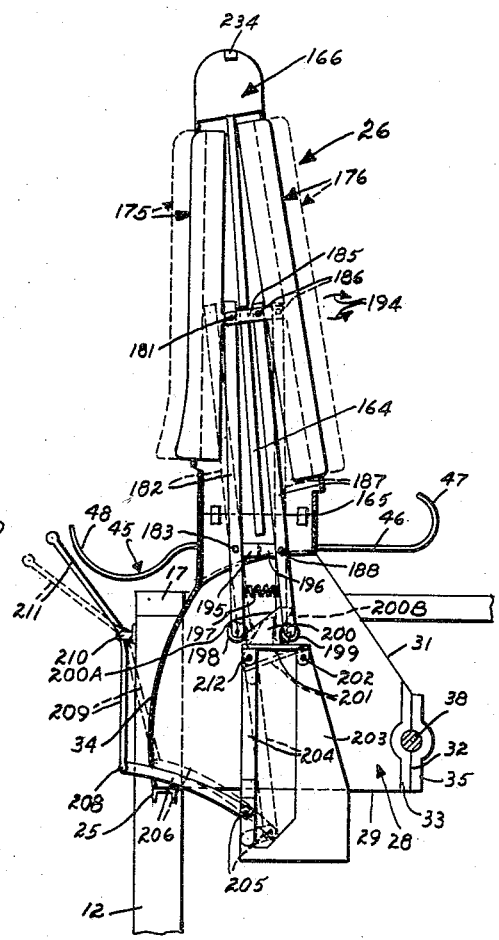
Figure 6 is a fragmentary side elevational view of the spatulate form and a portion of the machine frame showing one of the pressing faces of the spatulate form removed so as to reveal the expanding wing mechanism of the spatulate form.

Referring to Figures 6, 9 and 10, particularly, each of the spatulate forms generally designated 26 and 27 are of identical construction and hence only one need be described. Referring to Figure 6 which shows the spatulate form 26, the form has a central main brace 164 which extends from the upper level 165 of the protuberance 42 up to the cap portion generally designated 166 on the upper end of the spatulate form. This main backbone of the spatulate form has a transverse thickness which determines the thickness of the spatulate form at its mid-portion. Upon each side of this backbone piece 164 there is a metal shell as at 167 and 168, Figures 9 and 10, the shell pieces 167 and 168 being flanged down along their front and rear edges as at 169 and 170 for the shell piece 167 and at 171 and 172 for the shell piece 168. The flanges 169 and 171 are spaced from each other, as are flanges 170 and 172, and extending out through the flanges are wing pieces generally designated 175 and 176. The wings have a central metallic piece 178 for wing 175 and 179 for wing 176 and each wing is covered by a padding which extends out and curves around its outer edge. Thus, the metal piece 178 which is cut to the contour shown in Figure 6 is covered by the padding 178A, whereas the metal piece 179 is covered by the padding 179A, the padding being fastened in any suitable way as by staples along the rear edges at 178B and 179B. Each of the metal center pieces as 178 and 179 is provided with an inwardly extending tail. Thus, the metal piece 178 which forms the front wing has the inwardly extending tail 180, which is pivoted at 181 upon a lever 182, the lever in turn being pivoted at 183 upon the housing 42. Similarly, the thin or central metal piece 179 of the rear wing has an inwardly extending tail piece 185 which is pivoted at 186 to the lever 187 which is in turn pivoted at 188 upon the housing 42. The tail piece 185 on the central metal fin 179 on the rear wing is bent at 190 and then extends through a slot 191 in the central frame piece 164. This is to assure that the rear wing 176 does not tip excessively on its pivot 186. The slot 191 has a vertical dimension to permit a limited amount of movement as indicated by the pair of arrows 194, sufficient to allow the wing 176 enough freedom of movement to conform to sleeves or tubular garment portions of varying taper. The front to back width of the wing 176 can accordingly be made somewhat narrower than for the wing 175. Excessive tipping movement of the wing 175 is prevented by the width of the wing, as compared to the dimensions of the remaining components of the spatulate form. Upon each of the long levers 187 and 182, and adjacent their respective pivots 188 and 183 there is fixedly mounted a gear segment. Thus, the lever 182 has a gear segment 195 attached to it and centered about the pivot 183, while the lever 187 has a gear segment 196 attached to it and centered about the pivot 188. The effect of these gear segments is that it equalizes the movement of the levers 182 and 187, since when one moves the other is likewise compelled to move by interaction of the gear segments 195 and 196. A tension spring at 197 is provided between the lower ends of the long levers 182 and 187 which causes the lower ends of the levers to be drawn together. At the lower end of each lever there is likewise provided a roller. Thus, roller 198 is provided at the lower end of lever 182 and roller 199 is provided at the lower end of the lever 189. These rollers are provided so as to move the lower ends of the levers 182 and 187 apart and hence to move their upper ends together so as to move the wing sections 175 and 176 into the confines of the spatulate form. When the rollers 198 and 199 are not pushed apart the spring 197 pulls the levers together at their lower ends and causes the wings 175 and 176 to be moved outwardly with respect to the body of the spatulate form.

Movement of the rollers is controlled by means of a cam 200 having front and rear faces for engaging the rollers. The cam is mounted upon a tipping plate 201 that is in turn mounted for tipping movement about the pivot 202 on the frame 203. The tipping plate 201 has a downwardly extending fixed member 204 which has its lower end pivotally connected at 205 to a link 206 which is in turn pivotally connected at 208 to the lower end of a hand lever 209 that is pivoted at 210 on the front of the machine frame. The upper end 211 of the hand lever can be moved from the full line to the dotted line position, as shown in Figure 6, and when this occurs the tipping plate is drawn downwardly by the link 204, which is pivoted to the plate at the pivot 212 and accordingly the cam 200 is withdrawn from between the rollers 198 and 199, thereby permitting the wings 175 and 176 to be expanded by action of the spring 197. This expanding effect can be obtained manually by the operator, by moving the lever 211 from the full line position to the dotted line position in Figure 6, and the wings can be retracted by opposite movement. The operator accordingly can move the lever 211 to the full line position, and with the wings 175 and 176 thus retracted, as shown in Figure 6, the sleeve or pant leg of a garment can easily be pulled onto the spatulate form. The operator can then move the lever 211 to the dotted line position of Figure 6 and the garment will be tensioned, as shown in Figure 9.

However, the operator need not, if it is not desired, move the lever 211, since when the spatulate form itself is moved, as previously described, from the position shown in Figure 1 to the position shown in Figure 2, this causes the rollers 198 and 199 to be moved off the cam 200, it being noted that the cam has a surface 200A in the front which gradually lets down the roller 198 and a corresponding surface 200B at the rear which lets down the roller 199 until they are entirely free of the cam. These surfaces 200A and 200B are positioned with reference to the pivot shaft 38 so that rollers 198 and 199 are permitted gradually to move towards the wing expanding position as the entire spatulate form is moved towards the position shown in Figure 2. Therefore, even though the operator does not manipulate lever 211, the wings 175 and 176 are nevertheless expanded.

Referring to Figures 11 and 12, at the upper end of the spatulate form 26 and also spatulate form 27 there is an end cap 166 of highly polished metal, such as a chrome plated casting. This casting has a smooth exterior surface through which the bent hold-down bolt 213 passes and then extends in threaded engagement at 214 into the upper end of the central stiffening frame member 164. By removing the ornamental nut 216 the entire cap 166 can likewise be removed. The cap is kept from twisting by a number of cleats 217 on its interior surface, which engage the inner surfaces of the main frame pieces 167 and 168. On the interior of the cap 166 there is a small pivot bracket 218 which pivotally supports the stem 219 at the pivot 220. The stem has a flattened lower end 221 that engages against the inner end 222 of a push rod 223 that is normally pushed inwardly by the spring 224 that pushes against the washer 225 that is in turn held in place by the cotter pin 226. The stem 223 extends outwardly through a hole in the side of the cap piece 166 and at its outer surface carries a plate 228 that has gripping portions 228A and 228B for engaging the two separated ends of a cuff when the sleeve, with the cuff on it, is on the spatulate form. The plate 228 has a downwardly extending end portion 230 that is bent inwardly at 231 through an aperture 232 in the cap 166. In this way the plate 228 is kept from twisting. The lever 219 is manipulated manually by means of a smooth handle piece 234 that extends out through a closely shaped notch 235 in the cap 166. The handle piece can be engaged by the finger of the operator and moved in the direction of arrow 236 to accordingly push against inner end 222 of the stem 223 and thereby move the plate 228 outwardly for the insertion of the ends of the cuff under the gripping places 228A and 228B. The stem 219 is round and is adapted to be engaged by the couple of spring-pressed balls or indent 237 that are held between the bifurcated end 238 of the bracket 218. The stem 219 can accordingly be held in the position shown in Figure 11 or in the dotted line position, where the plate 228 is pushed out to the dotted line position. Referring to Figures 1, 2 and 3 it will be observed that a bracket is provided at 240 on the rear of the press and the bracket is in T shape, as shown in Figures 5 and 14. At each of the outer ends 240A and 240B of the bracket 240 there is provided a pivotally mounted plate 241 and 242, each having a weight at 241A and 242A so as normally to hold it in the position shown in Figure 14. The thumb piece 234 of the spatulate form 26 and the corresponding thumb piece 243 of the spatulate form 27 have engaging surfaces at 234A and 243A which engage the ends of the swinging plates 241 and 242 as the spatulate forms move in the direction of arrows 244 when the press begins to open. When this occurs the hand pieces 234 and 243 are pushed apart, as shown by the arrow 236, and this accordingly snaps the stem 219, Figure 11, of the spatulate form 26 and the corresponding stem of the spatulate form 27 from the position shown in full lines in Figure 11 to the dotted line position where it is held by the detent balls 237, and accordingly when the press reaches the fully open position shown in Figure 1, the cuffs are released and the operator can readily remove the sleeves from the spatulate form.

Referring to Figure 13 and Figures 9 and 10, each of the metal shell pieces 167 and 168 is provided with a pad as at 167A and 168A, and over this is stretched a very finely woven smooth cover at 167B and 168B. The covers extend around the padding and on the inside of the covers they are hemmed and provided with wires in the hem as at 167C in Figure 13. Hooks 246 are fastened on the studs 247 and are of springy character and have bent down tips 246A which engage through the cloth of the cover and under the wires 167C. The wires 246 being springy are tensioned around their mounting studs 247 so as to pull in the direction of arrows 248 and this, pulling against the wires 167C, serves to tension the cover 167B tightly around the padding 167A. Covers made of woven nylon give excellent service.

Referring to Figures 9 and 10, Figure 9 shows the spatulate form 26 with the garment G sleeved thereon and with the wings 175 and 176 moved outwardly so as to tension the garment. The garment pulls over the outer surface of the padding cover but stretches from the edges B to the outer edge of the wings. When the presser heads 191 and 192 are brought into pressing engagement with the spatulate form, the sleeve, which initially spanned from the corners B to the edges of the wings, is brought down into engagement with the inturned ends of the padded outer surfaces and also into engagement with the padded surfaces of the wings. The inner surfaces 101A and 102A of the presser heads are each essentially a longitudinal groove having edge flanges, the whole being shaped so as to conform in each case to one side of the padded outer surfaces of the pad covers 167B and 168B, and the fins 175 and 176 and accordingly pressing contact is achieved throughout the entire circumference of the tubular sleeve form, except at the edges E—E, as shown in Figure 10. This is no disadvantage, particularly for the pressing of the sleeves of white jackets, such as hospital coats, interns' coats, etc., but may be considered as a slight disadvantage for the finished pressing of men's white shirts.

It may be mentioned that each of the presser heads 101—102—103—104 is made in the form of an inner pressing surface and a housing over the rear thereof so as to provide a steam chest to which steam is admitted for heating purposes. If desired, a steam pipe 173 may be run up into the interior of the spatulate form so as to provide drying heat for maintaining the form free from moisture.

The spatulate form 27 is exactly the same as 26 and both are moved in unison. The operator takes the coat or a shirt and sleeves both of the sleeves onto the two spatulate forms 26 and 27 and holds the cuffs, where the cuffs are open, such as a barrel cuff or a French cuff, in place in wet condition by inserting them under the clip 228, Figures 11 and 12, and then by operating the controls of the press now to be described, the pressing operation is carried out.

Referring to Figure 15 air is admitted by way of the supply line 250 which extends to the closing push button 251 and the opening push button 252. When the push button 251 is operated air is admitted through line 253 to the pilot cylinder 254 of the air operated three-way main control valve 255. In Figure 15 the valve 255 is shown in the press open position in which no air is delivered from line 256 to line 257 and line 257 is open to the exhaust muffler 258. When air is introduced into the pilot cylinder 254 the operating lever 259 of the valve 255 is moved from the full line to the dotted line position, and in this position air is permitted to flow from line 256 to line 257 and thence through the timer valve 260, which is a needle valve, to the closing cylinder 56 previously described. The closing cylinder serves to move lever 53 from the position shown in Figure 1 to the position shown in Figure 2, and when this occurs the lever 53 which carries the adjusting stud 64, Figure 1, pushes against the valve 68 and air is then admitted by way of line 261 to the line 262. Line 262 extends to a quick exhaust valve 263 having a casing 264 and a piston 265 therein that is normally held in the position shown in Figure 15 by means of the internal spring 266. When air is introduced against the piston 265 it is driven down into engagement with the valve surface 267, and accordingly the engagement of the piston against the valve surface closes the port 267 which leads to the quick exhaust muffler 268 and in this position the piston uncovers the side port 269 which is coupled through pipe 270 to the squeezing cylinder 78. Accordingly, when valve 68 is opened air first operates the valve 263 and then introduces air into the cylinder 78 which brings about the movement of the presser head 101—102 and 103—104 from the position shown in Figure 1 and Figure 2 to the position shown in Figure 3 where they are in pressing engagement with the spatulate forms 26 and 27.

At the same time as valve 68 introduces air into line 262, air under pressure is introduced into line 271 and through the timer valve 273 into the timing cylinder 274. After a predetermined pressure has been built up in the timing cylinder 274 it moves the stem 275 and causes the lever 276 to be rocked about its pivot 277 and into engagement with the operating stem 278 of the valve 279, thus opening that valve and permitting air to flow through line 280 and through the valve 279 and thence through the check valve 281 into line 282 and thence into the opening pilot cylinder 283 which serves, when air is introduced into it, to move the main operating lever 259 of the main valve 255 to the full line position. It will be noted also that the operator may operate the opening push button 252 and introduce air from line 250 through the valve 252 and through line 284, line 282 into the opening pilot cylinder 283. When this is done the check valve 281 prevents air from backing up through the valve 279 which may at that time be open. When the cylinder 283 has air introduced into it and the valve 255 is accordingly opened, air is exhausted from the line 257 and 261 and through the then open valve 68, it being remembered that the locking lever 154, when the piston in cylinder 78 has been actuated, locked the spatulate form in the position shown in Figure 3. In this position valve 68 is held open and accordingly air exhaust from line 261 and also through valve 68 from lines 262, 271 and through the then open valve 263 from line 270 and cylinder 78. As soon as the pressure drops slightly in line 270 and cylinder 78, the spring 266 within the quick-opening valve 263 causes the piston therein to be moved to the position shown in Figure 15. When this occurs the valve port 269 is uncovered and the piston 265 is lifted off the port 267, thus permitting the air from cylinder 78 quickly to exhaust through muffler 268. Line 271 is in the meantime exhausted to line 262 and thence through valve 68 and lines 261 and 257 to muffler 258, thus decreasing the pressure in the timing tank 274. When the piston in cylinder 78 has completely retracted, the locking lever 154 is lifted off the locking pad 73 on lever 72 and then only is the spatulate form mechanism and its operating piston rod 55 in cylinder 56 permitted to swing back from the position shown in Figures 2-3 to the position shown in Figure 1, and only then is valve 68 again closed.

Accordingly, it is possible in one lay of the sleeve on the press to achieve a complete pressing operation in which the polished surfaces of the presser heads are brought into engagement with all of the exterior surface of the tubular garment member, except for the very narrow areas E—E, see Figure 10.

As previously mentioned for white shirts it is desirable not to have any area which is exposed during the wearing of the shirt, which has not been contacted by the smooth and polished pressing surfaces of the presser head. In order to achieve this perfection of pressing there is utilized the presser head arrangement shown in Figures 16-18 and the controls of Figure 19. By virtue of this arrangement it is possible to press the entire circumference of a tubular garment member except for one narrow longitudinal line, which can by properly arranging the sleeve on the spatulate form be chosen as a narrow line which is on the inside of the sleeve, toward the body of the shirt and hence not visible, all outer and visible portions of the sleeve being completely pressed against the smooth polished surface of the presser head. In order to accomplish this end the pressing machine is exactly as previously described, except for the following changes:

Referring to Figures 16 there is illustrated a modified form of mounting for the presser head. In Figure 16 presser head 101 is illustrated, it being understood that head 102 faces it and that the presser heads 103 and 104 are mounted in a manner about to be described. In Figure 16 the bracket 132 which carries presser head 101 is provided at its outer end with a rounded shaft portion 132A which is threaded at its outer end 132B. Upon this rounded shaft there is mounted a hub 285 which has integral solidly mounted extending spokes 286 and 287 extending radially from the hub and opposite each other. The spokes 286 and 287, which are thus aligned and mounted on the hub 285, are free to turn on the rounded shaft portion 132A of the bracket 132, the hub 285 being retained in place by a pair of nuts 288. The outer ends of the two spokes 286 and 287 are likewise provided with rounded shaft portions 289 for spoke 286 and 290 for spoke 287 which are received in the pillow block bearings 291 for the shaft end 289 and 292 for the shaft end 290. The bearing blocks, which are best shown in Figures 17 and 18, are each fastened to the presser heads. Thus, the bearing block 291 shown in Figure 18 is fastened to the presser head 101 by cap screws 294—294 or other suitable fastening means, the bearing 292 being likewise so fastened. For the presser head 102 the bearing bracket 130 is made similar and is provided with a shaft end, not shown, corresponding to the shaft end 132A for the bracket 132 and there is provided a similar hub portion held in place thereon which has radial integral spokes corresponding to spokes 286 and 287. In Figure 18 one of these spokes 295 is visible and is received in the bearing block 296 which is held in place by the cap screws 297. The effect of this mounting is that each of the presser heads 101 and 102 is permitted a freedom of rotation about the shaft end 132A for presser head 101 and the corresponding end on the bracket 130 for presser head 102 which permits the presser heads to move towards and away from each other at the upper and lower ends around these shaft ends. At the same time the presser heads each have a freedom of motion about the axis of the spokes 286—287 for presser head No. 1 and the axis of the corresponding spokes of which 295 for presser head 102 is shown in Figure 18 which allows the presser heads to move like a hinge with respect to each other about the mating lower edges 298 of Figures 11 and 18.

The presser heads 101 and 102 and also 103—104 have cooperating wide flanges at 300 for head 101 and 301 for head 102 and through the flanges extend loosely the bolts 302 which have nuts on opposite ends thereof and which are equipped with springs 303 and 304 as shown in Figures 17 and 18. On the flange 300 there is mounted a conical locating tip 305 which reaches into a correspondingly shaped conical recess 306 on the flange 301. The effect of this bolt and spring arrangement composed of a plurality of bolts 302 and spring 303—304 for each bolt, located along the length of flanges 301 and 300, as shown in Figure 16, is that the flanges are drawn together into mating relationship under the action of the springs 303 and 304 whenever the presser heads 101 and 102 are moved to the open press position, shown in Figure 17, by virtue of the corresponding movement of the brackets 132 and 130 and the press mechanism. The effect of the locating pins 305 and recesses 306 is that the pins very accurately locate the inner corner 308 of the presser head 101 with reference to the inner corner 309 of the presser head 102 when the heads are pulled by the spring-bolt arrangement to the position in 101—102. Accordingly, when the presser heads are in the position shown in Figure 17, there is provided a very smooth polished pressing surface which reaches around from the area 101D of presser head 101 through the curved portion 101E of the same presser head and across the meeting line defined by the edges 308 of presser head 101 and 309 of presser head 102, thence around the curve 102E of presser head 102 to the more flat region 102D of presser head 102. When the presser heads 101 and 102 are thus in the position shown in Figure 17, a smooth curved bottom pressing surface, which is heated by steam, is provided along the area 101E, 308, 309, 102E.

The spatulate form generally designated 310 that is used in conjunction with this presser head arrangement of Figures 17 and 18 is exactly the same as that previously described with reference to Figures 1-15, except that the rear wing 176 is removed and the metal 167 and 168 is shaped so that their rear flanges 170 and 172, respectively, meet together along the line 311 so as to form an integral whole, and the padding and the pad cover are run continuously around this curve. Accordingly, the spatulate form has a smooth curved rear portion in the area 312 which has an exposed pressing surface having a radius just very slightly in excess of the radius of the curve defined by portions 101E—308—309—102E previously mentioned. The front wing 175 of the spatulate form 310 is precisely the same as that previously described with reference to Figures 9-10, etc. and is movable in and out for tensioning the tubular garment portion G on the spatulate form 310.

The only other modifications of the machine are that in this form of mechanism the cylinder 56 is of relatively greater size and diameter and power than in the machine previously described. In the machine referred to with reference to Figures 1-15, the cylinder 56 serves merely to swing the spatulate forms into position for pressing but the cylinder 56 did not produce any pressing operation. In the present form of the invention, Figures 16-19, the cylinder 56 does perform the initial part of the pressing operation. Thus, in the initial part of the operation the spatulate forms, as just described, built like the form 310, are swung into the position shown in Figure 17, at which time the presser heads, such as heads 101 and 102 are "open" and in this position the line 308 of head 101 is contiguous with the line 309 of head 102. Accordingly, as the spatulate form 310 is swung into the thus "open" presser heads, the curved portion 312 of the garment stretched on the spatulate form is forced into pressing engagement with the curved surface 101E, 308, 309, 102E and pressing occurs. The main cylinder 78 is then operated, either manually or automatically and the presser heads 101 and 102 are moved towards each other. When this occurs the portion of the pressing surface at 101E and 102E rolls along the corresponding surface of the spatulate form 310 and accordingly the edges 308 of head 101 and 309 of head 102 are pulled away from each other, meanwhile compressing the springs 303—304 as a result of this pull-away effect. At the same time the remaining portions of the longitudinal grooves of the two presser head ironing surfaces come into engagement with the unpressed portions of the garment on the spatulate form extending around the dimension F for presser head 101 and H for presser head 102 until the presser heads reach the position shown in Figure 18 and therefore the only portion of the tubular garment section which is not contacted by the polished surfaces of the presser heads during some part of the pressing operation, is the tiny edge area K of Figure 18. Since the operator can drape the tubular garment section appropriately on the spatulate form 310, this portion K which is very narrow, ranging from $\frac{1}{16}$–$\frac{1}{8}$ of an inch can be the under side of the sleeve, that is to say that portion of the sleeve which is toward the body of the wearer, and hence this portion is not visible when the shirt or coat is worn, all visible portions having been contacted by the polished pressing surfaces of the presser head.

The sequential operation of cylinder 56 and cylinder 78 for this method of pressing, as illustrated in the revised form shown in Figures 16–19, can be accomplished automatically by utilizing the controls shown in Figure 19. In Figure 19 air is supplied at line 250, as previously described, and is admitted through the closing push button valve 251 to the closing pilot cylinder 254 of the master control valve (three-way valve) 255. When the valve 255 is moved by the piston in cylinder 254 to the position shown in Figure 19, air is admitted as before through line 256 and valve 255 to line 257 and through the timing valve 260 which may optionally be included in this modification, and thence into the cylinder 56 which upon energization causes its piston rod 55 to be actuated which moves the crank lever 53 and the shaft 39 to swing the spatulate form 310 in the direction of arrow 314 to the position shown in Figure 17. It will be remembered that at this time the cylinder 78 does not have air entering it and accordingly the presser heads 101—102 and presser heads 103—104 are in the position shown in Figure 17. This initial movement of the spatulate forms accomplishes the pressing of area 312 of the sleeve on the spatulate form while the presser heads 101—102 and 103—104 are in the "open press" position.

For ordinary negligee shirts it is desirable to press the edge 312 for about three seconds. It will be understood, of course, that heavier garments may require much longer timing for this first portion of the pressing operation and that lighter garments a lesser length of pressing.

The timed closure of the presser heads 101—102 and 103—104 by virtue of operation of the cylinder 78 is accomplished as follows:

Under the bracket 316 in Figure 19 there is illustrated a timing mechanism which includes a lever 317 pivoted at 318. The lever is normally held in the position shown in Figure 19 by a lifter arm 319 which is attached to the spatulate form mechanism so that it is moved around the shaft 318 as a center and swings its free end along the path of the double arrow 320 into and out of engagement with one end of the lever 317 so that when the spatulate form is in the position shown in Figure 19, the end of the lever 317 is lifted to the position likewise shown. When the spatulate form moves toward closed press position for the initial pressing of the area 312, Figure 17, the support provided by arm 319 under the lever 317 is withdrawn and the lever 317 is then moved downwardly under the influence of weight 321 and the weight presses against the upper button 322 of the timing stem 323 in the timing cylinder 324. The stem is provided with a piston at 325 that moves up and down in the cylinder. The cylinder is filled with oil or other liquid and the liquid can pass from below to above the piston 325 by means of the by-pass 326 having a needle valve 327 therein for time control regulation. The cylinder is also provided with a by-pass at 328 having the check valve 329 which prevents the flow of liquid from below to above the piston when the piston is moving down, but permits the flow of liquid from above the piston to below it when the piston is lifted up. On the lever 317 there is provided a clip 330 which is attached to the lever and reaches under the head 322 of the timing stem so that when the lever 317 is lifted by the action of the arm 319 on the swinging spatulate form mechanism, the clip 330 will lift the head 322 of the timing stem and hence raise the piston 325 in the cylinder 324, and when this occurs the oil which is above the piston is driven through the check valve 329 without restriction and into the area below the piston 325. When the supporting lever 319 is swung downwardly by the action of the movement of the spatulate form mechanism, the weight 321 presses on the head 322 of the timing stem and drives the piston down at a rate determined by the rate of flow of liquid through the needle valve 327 and by-pass 326. This provides a time regulation. When the lever 317 has moved down to a prescribed position the adjustable bolt 322 thereon moves into engagement with the head 333 of the valve 334 which is normally held closed by the spring 335 and opens this valve, thereby permitting air to flow from line 257 through line 261 and valve 334 to line 262 and thence through the quick release valve 263 and line 270 to cylinder 78, as previously described, thus energizing the cylinder 78 and causing its piston to be moved outwardly from the position shown in Figure 2 to the position shown in Figure 3, thus moving the presser heads 101—102 and heads 103—104 from the position shown in Figure 17 to the position shown in Figure 18. The movement of the timing lever 317, however, is not restricted after opening the valve 334 but merely opened that valve further and after a further interval which times the second portion of the pressing operation, with the heads 101—102 in the position shown in Figure 18, the end 317A of the lever 317 which carries the adjustable bolt 337 is brought into engagement with the head 338 of the operating stem on valve 340 which is normally held closed by the action of the spring 341, thereby permitting air to flow through from line 258 through line 343, valve 340 to line 342 and thence through the check valve 281 to the opening pilot cylinder 283 of the master valve 255. When cylinder 283 thus has air introduced into it the operating lever 259 of the master valve 255 is moved to the dotted line position shown in Figure 19 and valve 255 then exhausts line 257 through the muffler 258. Opening action of the press can also be accomplished at any time by the operator pressing upon the opening control valve 252 which likewise introduces air through line 284 into the pilot cylinder 283. When the valve 255 is moved to the exhausting condition, in which the line 256 is closed off and line 257 is opened to the exhaust 258, air is permitted to exhaust from the cylinder 56 and also through line 261, valve 334, which is then open, and line 262 from the cylinder 78. It will be remembered that so long as cylinder 78 is energized and accordingly in the position shown in Figure 3, the locking lever 154 is in engagement with the locking pad 73 on the lever 72 and accordingly holds the spatulate form mechanism in the position shown in Figures 2-3 and this condition continues until the cylinder 78 is completely retracted. Accordingly, the reach arm 319 on the spatulate form mechanism, Figure 19 is in the lowered position and therefore valve 334 remains open, until cylinder 78 has completely retracted. The quick exhaust valve 263 of Figure 19 operates in the manner already described with reference to the circuit diagram Figure 15 so that when the pressure has dropped slightly in cylinder 78, the valve 263 opens and therefore quickly exhausts cylinder 78. This produces a smart opening of the press but the spatulate form mechanism cannot under any circumstances begin its movement from the position shown in Figure 3 to the position shown in Figure 1 until the cylinder 78 has completely retracted, at which time the presser heads 101—102 and 103—104 are open in the position shown in Figure 17.

It will be appreciated that many other forms of timing mechanisms may be used in place of that shown in Figure 19 and that, indeed, a timing mechanism need not be used at all, but cylinder 78 can be operated manually under the control of the operator by use of a separate control valve. The single lay sleeve press timed sequence operation of pressing first a longitudinal area of the sleeve (312 of Figure 17) and then the final pressing operation by which the remainder of the sleeve is pressed, is a feature of the invention and as a method distinct from the apparatus is a subject matter of claims.

As many apparently widely different embodiments of this invention may be made without departing from the spirit and scope thereof, it is to be understood that we do not limit ourselves to the specific embodiments herein.

What we claim is:

1. A press for tubular garment sections comprising a frame, a tapered form tapered from one end towards the other mounted on said frame for swinging movement about a pivot axis through the large end thereof, means for swinging the form from an upright loading position to a rearwardly slanted pressing position, a pair of presser heads each having a pressing surface conforming to opposite halves of the exterior surface of said form, said presser heads being mounted generally parallel to the form when it is in its rearwardly slanted pressing position, presser head operating means for moving the presser heads towards each other and into pressing engagement with opposite sides of the form and then way from each other to a position out of engagement with the form and means responsive to swinging movement of said forms for energizing said presser head operating means for bringing said heads into engagement with opposite sides of the form.

2. A press for tubular garment sections comprising a frame, a form tapered from one end towards the other mounted on said frame for swinging movement about a pivot axis and through the large end thereof, means for swinging the form from an upright loading position to a rearwardly slanted pressing position, a pair of presser heads each having a pressing surface conforming to opposite halves of the exterior surface of said form, said presser heads being mounted generally parallel to the form when it is in its rearwardly slanted pressing position, presser head operating means for moving the presser heads towards each other and into pressing engagement with opposite sides of the form and then away from each other to a position out of engagement with the form, locking means operable simultaneously with movement of said presser heads into engagement with the form for locking said form in its position for pressing, said locking means remaining in locking position until the presser heads are moved away from the form sufficiently so as to permit the form freely to retract from between the opposed faces of the presser heads.

3. A press for tubular garment sections comprising a frame, a form tapered from one end towards the other mounted on said frame for swinging movement about a pivot axis through the large end thereof, means for swinging the form from an upright loading position to a rearwardly slanted pressing position, a pair of presser heads each having a pressing surface conforming to opposite halves of the exterior surface of said form, said presser heads being mounted generally parallel to the form when it is in its rearwardly slanted pressing position, presser head operating means for moving the presser heads towards each other and into pressing engagement with opposite sides of the form and then away from each other to a position out of engagement with the form and means responsive to swinging movement of said forms for energizing said presser head operating means for bringing said heads into engagement with opposite sides of the form, said form being hollow and having opposed generally slightly convex faces flanged at the edges so that the flanges are disposed towards each other and terminate so as to leave a narrow slot along each edge of the hollow flat form, and a fin positioned in each of said slots, said fins being mounted for movement generally into and out of said slots, each of said fins also being mounted pivotally about axes intersecting the form and parallel to the pivot axis of the form.

4. In a press for tubular garment sections, a frame, a form tapered from a portion of larger girth to a portion of smaller girth, a swing frame upon which the form is mounted as an extension with larger girth nearest the swing frame, a pivot transversely through the swing frame, means connected to said swing frame for swinging it and the form from an upright loading position to a rearwardly inclined pressing position, a pair of presser heads positioned for engaging said form when said form is in said rearwardly inclined pressing position, each of said presser heads engaging approximately a longitudinal half of said form in said pressing position for pressing a garment thereon, a table portion mounted on the swing frame around the base of the form and movable therewith from loading to pressing positions, said table having an edge thereon for retaining other parts of a garment during swinging movement of the form.

5. In a press for tubular garment sections, a form tapered from a portion of larger girth to a portion of smaller girth, a pivot transversely through the large end of the form, means connected to said form for swinging it from an upright loading position to a rearwardly inclined pressing position, a pair of presser heads each engaging approximately a longitudinal half of said form in said pressing position for pressing a garment thereon, means for mounting said presser heads in a position for engaging said form when said form is in said rearwardly inclined pressing position including a pair of slide bars mounted parallel for sliding motion and one connected to each of the presser heads, each slide bar having a notch therein, a shaft mounted for rotation to and fro about an axis intersecting the plane of said slide bars and crank pins connected to the shaft and reaching into the notch of each bar for sliding one in one direction and the other in the other direction as the shaft is rotated in one direction, thereby to move the presser heads towards the form for pressing and for sliding the bars each in the reverse direction when the shaft is rotated in the opposite direction for releasing the presser heads from pressing engagement.

6. A press for tubular garment sections comprising a pair of presser heads each having a first meeting flange along one boundary of the pressing surface of that head, the pressing surface of each head being a longitudinal groove, each presser head having a second meeting flange along the opposite boundary of the pressing surface of that head, means for normally resiliently urging said second flanges into contact with the edge line of one head contacting and substantially aligned with the edge line of the other head, the portions of the pressing surface of said heads adjacent the edge line of each forming together a combined pressing area accessible by movement in the plane of contact of said contacting flanges, a form having a convex edge shaped to fit said combined pressing area and the remainder of the form shaped so as to be out of contact with the remainder of the surface of at least one of the presser heads when said convex edge is against said combined pressing area, said frame being normally positioned out of contact with said presser heads, means for moving said form in the direction of the plane of said contacting flanges until the convex edge thereof is in pressing engagement with the combined pressing area and for then rocking the presser heads relative to each other while maintaining pressure of the heads against the form to bring the remainder of pressing area of each head into contact with the remainder of the outside of said form to complete the pressing operation while simultaneously parting said flanges.

7. The apparatus of claim 6 further characterized in that the presser heads each have a wing flange in a plane forming an obtuse angle with the plane of the meeting flanges of said heads and which wing flanges form extensions of the pressing surfaces of the presser heads, said form being provided with an edgewise expansible fin, the opposite sides of which are engaged by the wing flanges when the presser heads are rocked to complete the pressing operation.

8. The apparatus of claim 6 further characterized in that first motor means is provided for moving the form to bring the convex edge thereof into pressing engagement with said combined pressing area and second motor means is provided for rocking the heads to complete the pressing operation.

9. The apparatus of claim 8 further characterized in that timer means is provided to initiate operation of said second motor means at a predetermined time after operation of said first motor means.

10. The apparatus of claim 8 further characterized in that timer means is provided to initiate operation of said second motor means at a predetermined time after operation of said first motor means, and for then after a predetermined time releasing the second and first motor means successively.

11. A pressing machine comprising a pressing surface composed of two cooperating presser heads facing each other, each having a longitudinally recessed portion smoothly connected along one edge to an integral pressing flange and along the other edge to a meeting flange, said pressing flange being in a plane which makes an obtuse angle with the meeting flange, means for resiliently urging the meeting flanges of one presser head into engagement with the meeting flanges of the other, the pressing flanges being thereby spaced from each other and the longitudinally recessed portions of the presser heads forming an internal generally tubular space into which access is available through the space between the spaced apart pressing flanges, the said longitudinally recessed portions of the heads which are adjacent the engaging meeting flanges forming together a combined pressing surface generally opposite said space, an elongated form having a thickness such that it can be entered by edgewise movement through said space and into contact with said combined pressing surface, said form being out of contact with the remainder of the pressing surfaces of the presser heads, means for moving said form thus edgewise to iron a longitudinal area of a tubular garment component sleeved on said form, and means for then moving the presser heads towards each other so as to rock them and thereby bring the pressing flanges towards each other and complete ironing of the remainder of the tubular garment component, the meeting flanges being then spread apart.

12. The apparatus of claim 11 further characterized in that the form is tapered and the longitudinally recessed portions are correspondingly tapered.

13. The apparatus of claim 11 further characterized in that the junction of the longitudinally recessed portion of each head and the meeting flange thereof is a straight edge, the edges of the two presser heads meeting to form said smooth combined pressing surface, the longitudinally recessed portion of each head being smoothly curved to join the pressing flange thereof.

14. The apparatus of claim 11 further characterized in that the form has a smoothly curved edge, which engages said combined pressing surface, said smoothly curved edge being connected to generally parallel faces which are then curved towards each other and terminated to form a slot, and a flat fin is provided and mounted for edgewise movement into and out of said slot, the longitudinally recessed portions of the heads when rocked being shaped so as to lift away from the smoothly curved edge and into contact with the opposite generally flat faces and incurved edges, with said pressing flanges substantially parallel and in contact with opposite surfaces of said fin.

15. The apparatus of claim 14 further characterized in that means is provided automatically to project said fin as the form moves towards said combined pressing surface.

16. A pressing machine having a tubular sleeve form, a pair of presser heads movable from a separated position towards each other for engaging opposite longitudinal approximately half sections of the sleeve for ironing the same, means for moving the form to and from a position between the heads, said form extending beyond the heads, a cuff clamp mounted on said tubular sleeve form adjacent one end thereof and movable therewith for holding the edges of a cuff when the sleeve is on the form for ironing, operator controlled means for moving the clamp to and from clamping position, and automatic means for releasing the clamp when the form is moved from between the presser heads when pressing is completed.

17. The apparatus of claim 1 further characterized in that two forms are provided for simultaneously pressing two tubular garment sections and a pair of presser heads are provided for each of said forms, said presser head operating means being connected to the pair of presser heads of each form for simultaneous opening and closing movement and equalizing means is provided for equalizing the pressing force applied to the forms.

18. The method of pressing a tubular garment section which comprises sleeving said tubular garment section on a mandrel, moving said mandrel in a direction generally transverse to its longitudinal axis through a narrow longitudinal slot in the wall of an elongated pressing cavity, the walls of which form a pressing surface conforming to the mandrel when the pressing cavity is closed thereon, continuing the movement of said mandrel with the tubular garment section thereon until the mandrel with the garment thereon contacts against the portion of the pressing surface within said cavity opposite said longitudinal slot therein so as to press a longitudinal strip of said tubular garment section, then moving said pressing cavity walls towards each other in a direction to close said slot and bring said walls into contact with the remaining portions of said mandrel and the tubular garment section thereon to complete the pressing operation, and simultaneously opening said pressing cavity along a line directly opposite said slot and moving the pressing surfaces adjacent said line away from said mandrel.

19. The method of pressing a tubular garment section in one lay by pressing successive longitudinal areas thereof which comprises sleeving said tubular garment section on a mandrel, moving said mandrel in a direction generally transverse to its longitudinal axis through a narrow longitudinal slot in the wall of an elongated pressing cavity, the walls of which form a pressing surface conforming to the mandrel when the pressing cavity is closed thereon, continuing the movement of said mandrel until a narrow longitudinal area thereof not exceeding the width of the slot contacts the wall of the pressing cavity opposite the longitudinal slot therein, to press said longitudinal area of a tubular garment section, then moving portions of said cavity walls relative to each other so as to close said slot and bring the said pressing walls into contact with the remaining area of said mandrel to complete the pressing operation, said pressing walls adjacent said narrow longitudinal area initially pressed being moved away from said mandrel and separated so as to provide another slot opposite the original slot.

20. The method of pressing a tubular garment section in one lay which comprises sleeving said tubular garment section on a mandrel, moving said mandrel in a direction generally transverse to its longitudinal axis through a narrow longitudinal slot in the wall of an elongated pressing cavity, the walls of which form a pressing surface conforming to the mandrel when closed thereon, continuing the movement of said mandrel with the tubular garment section thereon until a narrow longitudinal area thereof, not exceeding the width of the slot, contacts the wall of the pressing cavity opposite the longitudinal slot therein so as to press said longitudinal area of said tubular garment section, then moving portions of said pressing cavity walls relative to each other so as to close said entrance slot and bring the said portions of the pressing cavity walls into contact with the lateral portions of said mandrel, meanwhile moving the pressing walls adjacent said narrow longitudinal area initially pressed away from this initial area and opening said pressing walls in said area so as to produce another separated slot opposite the original now closed entrance slot, then moving portions of said pressing cavity back to their original positions so that the second slot adjacent to the initially pressed area is again closed and the entrance slot is again opened, bringing the lateral walls of the pressing cavity away from the mandrel with the tubular garment section thereon, moving the mandrel in a reverse direction out of the pressing cavity and back to its starting position.

21. In a press for tubular garment sections a pivot shaft having a form mounted on the shaft, said form including a frame extending at right angles to the shaft and constituting the framework for the form, said form also including a pair of plates fastened in spaced relation, generally parallel to each other on said frame, each of the plates being flanged at the edges toward the other plate, said plates being terminated so as to leave slots between them, a pair of fin plates positioned so as to lie in said slots, said flanged plates and said fin plates forming a pressing surface, a pair of rods pivoted on said frame between the plates and pivot shaft for pivotal movement, one end of each of said rods pivoted to one of said fins, at a position about midway between the ends thereof for movement of the fin plate edgewise under the influence of the rod, cam means provided and mounted for engagement with the rods for moving said fin plates to a position most retracted within the space between said form plates, means normally biasing said fin plates in a direction so as to be projected, and said cam being positioned so that when the form is moved on the pivot shaft said rods will be moved relative to the cam in a direction to allow said normally biasing means to project said fins.

22. A pressing machine comprising a composite buck structure having an internal frame forming an inside support for said buck, a pair of plates of substantially the same shape and each having a substantially greater length than width, said plates being fastened on opposite sides of said frame so as to face each other, the plates being slightly curved towards each other along generally the center line of their length and abruptly bent towards each other adjacent their terminal lengthwise edges so as to form edge flanges, the frame being of sufficient thickness in respect to said edge flanges to maintain the flange of one plate spaced from the flange of the other plate so as to form opposed slots, one along each of the lengthwise edges of said composite buck, padding on the outer surfaces of said plates, cover cloths pulled tightly over said padding and around the edge of said flanges and into the slot and thence fastened to the insides of said flanges, said composite buck also including a pair of lightly padded wings each having a substantially uniform thickness only slightly less than the width of the slots, said wings mounted on the frame at substantially the midplane of the composite buck for movement edgewise into and out of the slots for tensioning a garment laid around the composite buck, each of said wings being smoothly curved around its outer edge, means for internally heating the composite buck, the maximum thickness of the composite buck being several times the thickness of said wings, means for moving said composite buck edgewise by motion parallel to the mid-plane thereof from a loading position to a pressing position and vice versa, a pair of presser heads mounted at the pressing position, each head having a central groove section shaped to conform and press the exterior surface of one of the padded plates from closely adjacent the slot on one side, thence across the width of the padded plate to closely adjacent the slot on the other side and throughout the length of the buck, each of said heads having integral edge flanges extending straight out at each side from the groove and shaped to press against one face of each of the wings when the wings are extended maximally from the slots, the flanges of each head being in substantially the same plane, the flanges of the heads being smoothly joined to the groove section, and means at the pressing station for moving the heads by translatory motion to and from a non-pressing position in which the flanges of one head are substantially parallel to the flanges of the other and spaced apart sufficiently to let the composite buck move edgewise between said flanges to a pressing position in which the heads are against opposite faces of the composite buck for pressing in one lay a garment section draped thereon.

23. The apparatus of claim 22 further characterized in that at one end of the composite buck the plates are fastened to a smooth terminal end piece of polished metal extending from one side to the other of the plate portion of said composite buck, said end piece having a garment clamping member thereon.

24. In a press for tubular garment sections a pivot shaft having a form mounted on the shaft, said form including a frame extending at right angles to the shaft and constituting the framework for the form, said form also including a pair of plates fastened in spaced relation, generally parallel to each other on said frame, each of the plates being flanged at the edges toward the other plate, said flanges being terminated so as to leave a slot between them, a pair of fin plates positioned so as to lie in said slots, said flanged plates and said fin plates forming a pressing surface, a pair of rods pivoted on said frame between the plates and pivot shaft for pivotal movement, one end of each of said rods pivoted to one of said fins at a position about midway between the ends thereof for movement of said fin plate edgewise under the influence of the rod, cam means provided and mounted for engagement with the rods for moving said fin plates to a position most retracted within the space between said form plates, means normally biasing said fin plates in a direction so as to be projected, and manual means provided for retracting said cam means from engagement with said rods for allowing projection of said fins, said cam being positioned so that when the form is moved on the pivot shaft said rods will be moved relative to the cam and in a direction to project said fins.

References Cited in the file of this patent

UNITED STATES PATENTS

| Number | Name | Date |
|---|---|---|
| 2,375,947 | Robbel | May 15, 1945 |
| 2,395,466 | Couch | Feb. 26, 1946 |
| 2,481,399 | Davis | Sept. 6, 1949 |
| 2,595,514 | Davis et al. | May 6, 1952 |